(12) United States Patent
Baier et al.

(10) Patent No.: US 7,809,656 B2
(45) Date of Patent: Oct. 5, 2010

(54) MICROHISTORIANS AS PROXIES FOR DATA TRANSFER

(75) Inventors: John J. Baier, Mentor, OH (US); Taryl J. Jasper, South Euclid, OH (US); John T. Campbell, Bridgeville, PA (US); Robert J. McGreevy, Oswego, IL (US); Frank Anthony Palmieri, Jr., Gibsonia, PA (US); Robert J. Herbst, Aurora, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 559 days.

(21) Appl. No.: 11/862,891

(22) Filed: Sep. 27, 2007

(65) Prior Publication Data

US 2009/0089232 A1    Apr. 2, 2009

(51) Int. Cl.
*G06F 15/18*    (2006.01)
(52) U.S. Cl. ..................................... 706/12
(58) Field of Classification Search ............... 706/12
See application file for complete search history.

(56) References Cited

U.S. PATENT DOCUMENTS

| | | |
|---|---|---|
| 4,510,565 A | 4/1985 | Dummermuth |
| 4,553,205 A | 11/1985 | Porchia |
| 4,616,333 A | 10/1986 | Shimoni |
| 4,718,025 A | 1/1988 | Minor et al. |
| 4,731,735 A | 3/1988 | Borgendale et al. |
| 4,773,028 A | 9/1988 | Tallman |
| 4,975,865 A | 12/1990 | Carette et al. |
| 5,003,469 A | 3/1991 | Kamiyama et al. |
| 5,051,932 A | 9/1991 | Inove et al. |
| 5,274,781 A | 12/1993 | Gibart |
| 5,452,201 A | 9/1995 | Pieronek et al. |
| 5,805,442 A | 9/1998 | Crater et al. |
| 5,901,323 A | 5/1999 | Milliken et al. |

(Continued)

FOREIGN PATENT DOCUMENTS

EP    0490864    6/1992

(Continued)

OTHER PUBLICATIONS

A new general purpose compression method for searching in large collection, Bhadade, U.S.; Sharma, V.K.; Trivedi, A.I.; TENCON 2007—2007 IEEE Region 10 Conference Digital Object Identifier: 10.1109/TENCON.2007.4428935 Publication Year: 2007, pp. 1-4.*

(Continued)

*Primary Examiner*—Michael Holmes
(74) *Attorney, Agent, or Firm*—Turocy & Watson LLP; William R. Walbrun; John M. Miller

(57) ABSTRACT

Systems and methods that enable historians (e.g., microhistorians) to function as proxies, to supply plant level data, (e.g., history data) back to the controllers. Accordingly, typically such micro historians can function as clients/servers, to provide higher level data to the controllers (e.g., from third part databases). The historians can create a proxy that image an object on a server associated with controllers (e.g., programmable logic controller.) Such objects can contain data; pieces of code; attributes; operations or combinations thereof, for example.

20 Claims, 10 Drawing Sheets

U.S. PATENT DOCUMENTS

| | | | |
|---|---|---|---|
| 5,943,675 A | 8/1999 | Keith et al. | |
| 5,991,793 A | 11/1999 | Mukaida et al. | |
| 6,092,036 A | 7/2000 | Hamann | |
| 6,110,214 A | 8/2000 | Klimasauskas | |
| 6,139,201 A | 10/2000 | Carbonell et al. | |
| 6,204,782 B1 | 3/2001 | Gonzalez et al. | |
| 6,219,649 B1 | 4/2001 | Jameson | |
| 6,233,623 B1 | 5/2001 | Jeffords et al. | |
| 6,252,589 B1 | 6/2001 | Rettig et al. | |
| 6,263,487 B1 | 7/2001 | Stripf et al. | |
| 6,298,393 B1 | 10/2001 | Hopsecger | |
| 6,298,454 B1 | 10/2001 | Schleiss et al. | |
| 6,411,987 B1 | 6/2002 | Steger et al. | |
| 6,505,247 B1 | 1/2003 | Steger et al. | |
| 6,536,029 B1 | 3/2003 | Boggs et al. | |
| 6,539,271 B2 | 3/2003 | Lech et al. | |
| 6,559,861 B1 | 5/2003 | Kennelly et al. | |
| 6,574,639 B2 | 6/2003 | Carey et al. | |
| 6,618,856 B2 | 9/2003 | Coburn et al. | |
| 6,633,782 B1 | 10/2003 | Schleiss et al. | |
| 6,701,324 B1 | 3/2004 | Nair et al. | |
| 6,754,668 B2 | 6/2004 | Noble et al. | |
| 6,754,885 B1 | 6/2004 | Dardinski et al. | |
| 6,766,214 B1 | 7/2004 | Wang et al. | |
| 6,795,798 B2 | 9/2004 | Eryurek et al. | |
| 6,799,148 B2 | 9/2004 | Ling et al. | |
| 6,847,850 B2 | 1/2005 | Grumelart | |
| 6,847,854 B2 * | 1/2005 | Discenzo | 700/99 |
| 6,865,644 B2 | 3/2005 | Husted et al. | |
| 6,952,727 B1 | 10/2005 | Lindner et al. | |
| 6,975,913 B2 | 12/2005 | Kreidler et al. | |
| 7,043,311 B2 | 5/2006 | Nixon et al. | |
| 7,050,873 B1 * | 5/2006 | Discenzo | 700/99 |
| 7,069,201 B1 | 6/2006 | Lindner et al. | |
| 7,181,370 B2 | 2/2007 | Furem et al. | |
| 7,206,646 B2 | 4/2007 | Nixon et al. | |
| 7,206,965 B2 | 4/2007 | Roddy et al. | |
| 7,218,974 B2 | 5/2007 | Rumi et al. | |
| 7,228,310 B2 | 6/2007 | O'Brien | |
| 7,249,356 B1 | 7/2007 | Wilson et al. | |
| 7,272,665 B2 | 9/2007 | Yamada et al. | |
| 7,275,062 B2 | 9/2007 | Deitz et al. | |
| 7,286,888 B2 | 10/2007 | Monette et al. | |
| 7,299,367 B2 | 11/2007 | Hamm et al. | |
| 7,328,078 B2 | 2/2008 | Sanford et al. | |
| 7,359,930 B2 | 4/2008 | Jackson et al. | |
| 7,574,417 B1 * | 8/2009 | McGreevy et al. | 706/59 |
| 7,584,216 B2 | 9/2009 | Travieso et al. | |
| 7,616,095 B2 * | 11/2009 | Jones et al. | 340/10.5 |
| 7,627,385 B2 * | 12/2009 | McGreevy et al. | 700/20 |
| 7,684,876 B2 * | 3/2010 | Grgic | 700/19 |
| 7,693,585 B2 * | 4/2010 | Kalan et al. | 700/19 |
| 2002/0019839 A1 | 2/2002 | Shiu | |
| 2002/0069235 A1 | 6/2002 | Chen | |
| 2002/0120744 A1 | 8/2002 | Chellis et al. | |
| 2002/0133523 A1 | 9/2002 | Ambler et al. | |
| 2002/0169907 A1 | 11/2002 | Candea et al. | |
| 2002/0174263 A1 | 11/2002 | Codd et al. | |
| 2002/0184601 A1 | 12/2002 | Fitzhenry et al. | |
| 2003/0014130 A1 | 1/2003 | Grumelart | |
| 2003/0041135 A1 | 2/2003 | Keyes et al. | |
| 2003/0101208 A1 | 5/2003 | Chauvel et al. | |
| 2003/0172107 A1 | 9/2003 | Leyfer et al. | |
| 2003/0182303 A1 | 9/2003 | Gibson | |
| 2004/0153437 A1 | 8/2004 | Buchan | |
| 2004/0181294 A1 | 9/2004 | Deitz et al. | |
| 2005/0198034 A1 | 9/2005 | Boyer | |
| 2005/0198406 A1 | 9/2005 | Sichner | |
| 2005/0210337 A1 | 9/2005 | Chester et al. | |
| 2006/0004827 A1 | 1/2006 | Stuart | |
| 2006/0020928 A1 | 1/2006 | Holloway et al. | |
| 2006/0026559 A1 | 2/2006 | Gunturi et al. | |
| 2006/0067334 A1 | 3/2006 | Ougarov et al. | |
| 2006/0161268 A1 | 7/2006 | Frensch et al. | |
| 2006/0291283 A1 | 12/2006 | Jin et al. | |
| 2006/0294502 A1 | 12/2006 | Das et al. | |
| 2007/0006039 A1 | 1/2007 | Fichter et al. | |
| 2007/0027913 A1 | 2/2007 | Jensen et al. | |
| 2007/0028070 A1 | 2/2007 | Avergun et al. | |
| 2007/0038610 A1 | 2/2007 | Omoigui | |
| 2007/0050348 A1 | 3/2007 | Aharoni et al. | |
| 2007/0073744 A1 | 3/2007 | McVeigh et al. | |
| 2007/0112447 A1 | 5/2007 | McGreevy et al. | |
| 2007/0112801 A1 | 5/2007 | McGreevy et al. | |
| 2007/0136533 A1 | 6/2007 | Church et al. | |
| 2007/0142941 A1 | 6/2007 | McGreevy et al. | |
| 2007/0156770 A1 | 7/2007 | Espelien | |
| 2007/0244964 A1 | 10/2007 | Challenger et al. | |
| 2007/0282577 A1 | 12/2007 | Lind | |
| 2007/0288795 A1 | 12/2007 | Leung et al. | |
| 2007/0294078 A1 | 12/2007 | Kim et al. | |
| 2008/0027678 A1 | 1/2008 | Miller | |
| 2008/0082577 A1 | 4/2008 | Hood et al. | |
| 2008/0126408 A1 | 5/2008 | Middleton | |

FOREIGN PATENT DOCUMENTS

| | | |
|---|---|---|
| EP | 1109107 | 6/2001 |
| EP | 1307823 | 5/2003 |
| GB | 2347234 | 8/2000 |
| GB | 2353616 A1 | 2/2001 |
| WO | 2004027531 A1 | 4/2004 |
| WO | 2005006130 A | 1/2005 |
| WO | 2005006130 A3 | 1/2005 |

OTHER PUBLICATIONS

Input Data Representation for Self-Organizing Map in Software Classification, Yuqing Lin; Huilin Ye; Knowledge Acquisition and Modeling, 2009. KAM '09. Second International Symposium on vol. 2 Digital Object Identifier: 10.1109/KAM.2009.151 Publication Year: 2009 , pp. 350-353.*

Supervised and Traditional Term Weighting Methods for Automatic Text Categorization, Man Lan; Chew Lim Tan; Jian Su; Yue Lu; Pattern Analysis and Machine Intelligence, IEEE Transactions on vol. 31 , Issue: 4 Digital Object Identifier: 10.1109/TPAMI.2008.110 Publication Year: 2009 , pp. 721-735.*

Selecting predicate logic for knowledge representation by comparative study of knowledge representation schemes, Ali, A.; Khan, M.A.; Emerging Technologies, 2009. ICET 2009. International Conference on Digital Object Identifier: 10.1109/ICET.2009.5353207 Publication Year: 2009 , pp. 23-28.*

OA dated Jan. 4, 2010 for U.S. Appl. No. 11/558,710, 37 pages.

CN OA Due Dec. 29, 2008 for Chinese Patent Application No. 200710162327.9, 6 pages.

OA dated Mar. 30, 2010 for U.S. Appl. No. 11/558,705, 44 pages.

European Search Report dated Mar. 25, 2010 for European Patent Application No. EP 07 12 0362, 6 pages.

"High Level Triggers, Data Acquisition and Controls." ATLAS Technical Design Report, Jun. 30, 2003, pp. 1-370, XP002570453, Chapters 1-7, 9, 11, 13. http://cdsweb.cern.ch/record/616089/files/cer-002375189.pdf. Last accessed Apr. 1, 2010, 196 pages.

Vermeulen, et al. "ATLAS Dataflow: the Read-Out Subsystem, Results from Trigger and Data Acquisition System Testbed Studies and from Modeling." 14th IEEE—NPSS Real time Conference, Stockholm, Sweden, Jun. 4-10, 2005, pp. 270-274, XP010859081, ISBN: 978-0-7803-9183-3.

Gameiro, et al. "The ROD Crate DAQ of the ATLAS Data Acquisition System." 14th IEEE—NPSS Real time Conference, Stockholm, Sweden, Jun. 4-10, 2005, pp. 527-531, XP010859117, ISBN: 978-0-7803-9183-3.

European Search Report dated Mar. 25, 2010 for European Patent Application No. EP 07 12 0357, 5 pages.

OA dated Mar. 24, 2010 for U.S. Appl. No. 11/750,193, 36 pages.

European Search Report dated Mar. 10, 2010 for European Application Serial No. EP 08 16 4957, 7 pages.
Charbonnier, et al. "Trends Extraction and Analysis for Complex System Monitoring and Decision Support." Feb. 1, 2005, Engineering Applications of Artificial Intelligence, Pineridge Press, Swansea, GB, pp. 21-36, XP025299588, ISSN: 0952-1976.
Uraikul, et al. "Artificial Intelligence for Monitoring and Supervisory Control of Process Systems." Nov. 30, 2006, Engineering Applications of Artificial Intelligence, Pineridge Press, Swansea, GB, pp. 115-131, XP005786108, ISSN: 0957-1976.
OA dated Apr. 1, 2010 for U.S. Appl. No. 11/863,216, 28 pages.
"Major Canadian Natural Gas Producer Buys AnyWhere/AnyTime Services from Industrial Evolution" Mar. 12, 2001, Industrial Evolution pp. 1.
Real Time Intelligence at the Source-Deploying and EMbedded Historian. Users Conference 2005, pp. 1.
Miller, et al. "Extending the Reach of Enterprise Data Management in a World of M2M." ISA EXPO. Oct. 2005, pp. 1-7.
"Proficy Historian"; Dec. 16, 2004, GE FANUC, pp. 1-8.
European Search Report dated Feb. 22, 2008 for European Patent Application Serial No. EP 07 11 7388, 1 Page.
European Search Report dated Jan. 20, 2009 for European Patent Application No. EP08156281, 6 Pages.
EP Office Action for Application No. 08165215.8-1243 dated Mar. 3, 2009, 2 pages.
European Search Report and Written Opinion for European Application No. EP 08 16 5215, dated Dec. 8, 2008, 6 pages.
Sakharov. Macro-Processing in High-Level Languages. ACM SIGPLAN Notices, vol. 27, No. 11, Nov. 1, 1992, pp. 59-66, XP000328425, ISSN: 0362-1340. Last accessed Jan. 20, 2009, 18 pages.
Cardoso, et al. Macro-Based Hardware Compilation of Java (TM) Bytecodes Into a Dynamic Reconfigurable Computing System, Apr. 21, 1999. In IEEE Seventh Symposium on Field Programmable Custom Computing Machines, (FCCM'99). Napa Valley, California, Apr. 21-23, 1999. http://citeseerx.ist.psu.edu/viewdoc/summary?doi=10.1.1.41.8292. Last accessed Jan. 21, 2008, 10 pages.
European Search Report dated Feb. 5, 2008 for European Patent Application No. EP07117614, 8 pgs.
Alvestrand. "Tags for the Identification of Languages: rfc 1766. txt," Internet Engineering Task Force, Mar. 1995, XP015007553, Issn: 0000-0003. ftp://ftp.isi.edu/in-notes/rfc1766.txt. Last accessed Jun. 6, 2008, 9 pages.
European Search Report dated May 2, 2008 for European Patent Application No. EP07117622, 3 pgs.
Power Rich System, Enterprise Edition, Historian (PRS EE Historian) Version 1.5, last accessed Dec. 3, 2008, 15 pages.
Wonderware Plant Intelligence Solution Helps Arla Foods Deliver Fresh Milk Products to the Tables of Europe. Last accessed Dec. 3, 2008, 4 pages.
European Search Report dated Dec. 18, 2007 for European Patent Application Serial No. 07117364.5-2221, 2 Pages, May 27, 2010.
OA dated Dec. 18, 2008 for U.S. Appl. No. 11/536,522, 15 pages.
OA dated Apr. 3, 2009 for U.S. Appl. No. 11/536,522, 20 pages.
OA dated Jul. 21, 2008 for U.S. Appl. No. 11/536,522, 21 pages.
OA dated Oct. 13, 2009 for U.S. Appl. No. 11/536,522, 22 pages.
OA dated Sep. 16, 2009 for U.S. Appl. No. 11/558,705, 23 pages.
OA dated Apr. 22, 2009 for U.S. Appl. No. 11/558,705, 23 pages.
OA dated Jul. 29, 2009 for U.S. Appl. No. 11/558,710, 18 pages.
OA dated Nov. 14, 2008 for U.S. Appl. No. 11/558,710, 18 pages.
OA dated Jul. 28, 2008 for U.S. Appl. No. 11/536,545, 26 pages.
OA dated Dec. 12, 2008 for U.S. Appl. No. 11/536,545, 18 pages.
OA dated Jul. 10, 2009 for U.S. Appl. No. 11/536,545, 30 pages.
OA dated Jan. 26, 2009 for U.S. Appl. No. 11/536,535, 40 pages.
OA dated Jul. 23, 2008 for U.S. Appl. No. 11/536,535, 31 pages.
OA dated Dec. 3, 2008 for U.S. Appl. No. 11/536,566, 35 pages.
OA dated Jun. 25, 2010 for U.S. Appl. No. 11/862,182, 41 pages.
OA dated Jul. 22, 2010 for U.S. Appl. No. 11/862,183, 39 pages.
OA dated May 27, 2010 for U.S. Appl. No. 11/537,110, 77 pages.
OA dated Jul. 8, 2010 for U.S. Appl. No. 11/558,710, 28 pages.
OA dated Jun. 11, 2010 for U.S. Appl. No. 11/862,180, 27 pages.
OA dated Jun. 23, 2010 for U.S. Appl. No. 11/536,550, 51 pages.

* cited by examiner

MICROHISTORIANS AS PROXIES FOR DATA TRANSFER

TECHNICAL FIELD

The subject invention relates generally to historians associated with industrial controllers and more particularly to embedding and/or integrating historians that functions as proxy components for an industrial unit.

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

In a more macro sense than the controller, businesses have become more complex in that higher order business systems or computers often need to exchange data with such controllers. For instance, an industrial automation enterprise may include several plants in different locations. Modern drivers such as efficiency and productivity improvement, and cost-reduction, are requiring manufacturers to collect, analyze, and optimize data and metrics from global manufacturing sites. For example, a food company can have several plants located across the globe for producing a certain brand of food. These factories in the past were standalone, with minimum data collection and comparison of metrics with other similar factories. In the networked world of today, manufacturers are demanding real-time data from their factories to drive optimization and productivity. Unfortunately, conventional control systems architectures are not equipped to allow a seamless exchange of data between these various components of the enterprise.

Another requirement of modern control system architectures is the ability to record and store data in order to maintain compliance with administration regulations (e.g., Food and Drug Administration). One common solution for recording data includes providing a local recording module that often occupies a slot in a controller backplane such as a PC-Historian which is an industrial computer for the controller backplane, and employs a transitional layer to supply an indirect interface to the controller. This includes a platform that provides high speed, time series, data storage and retrieval with both local and remote control processors. The PC-Historian communicates with controllers directly through the backplane and can communicate remotely via a network interface. The PC-Historian allows archiving data from the controller to an Archive Engine which provides additional storage capabilities.

In general, conventional historian processors enable high-speed real-time data collection by communicating directly with the control processor across the backplane for fast data collection speeds. This includes handling large quantities of data over extended time periods while providing efficient storage and retrieval of process data over extended periods of time. These solutions are generally employed for electronic documentation and provide an audit trail and data flags for tracking modified, inserted, or incomplete data. In order to configure such products, a Graphical User Interface (GUI) can be provided to map controller tags defined in a local or remote processor to a data historian file.

There are several disadvantages to existing data collection and storage solutions however. Conventional PC-historians are generally applied on the back-end of system design and are thus loosely coupled or integrated within the framework of the control architecture. Such an arrangement leads to much inefficiency for collecting data and ultimately identifying what data should or should not be captured. Other shortcomings include issues related to which historians should collect what data, and how such micro historians map and integrate into a larger enterprise. In general, to supply the controllers with other historic data regarding process trends, proprietary softwares are employed that can further increase costs and add more complexities to the industrial process.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation provides for historians (e.g., microhistorians) that function as a proxy component to supply plant level data, (e.g., history data) back to the controllers. Accordingly, typically all such micro historians can function as clients/servers, to provide higher level data to the controllers (e.g., from third party databases). For example, control programs associated with the historians can direct such record keeping modules to read data values, and supply an array of Key performance indicators (KPI) to the controller. Accordingly, historical data, in conjunction with data collected during operation (e.g., current collected data) can be readily supplied to the controller. The controller can subsequently employ such data for modifying a process in real time.

In a related aspect the historian can create a proxy that images an object on a server associated with controllers (e.g., programmable logic controller.) Such objects can contain data; pieces of code; attributes; operations or combinations thereof, for example. Moreover, such object can be further defined by its interface, wherein the interface identifies characteristics and behavior of a kind of object (e.g., object reference), including the operations that can be performed on objects of that interface and the parameters for each operation. Accordingly, the historian of the subject innovation can form a proxy, which is an image of such object, wherein the object resides in a different logical and/or physical entity (e.g., machine, process, network, and the like.) As such, in distributed industrial system, the subject innovation can facilitate local processing of historian data and improve efficiency. Furthermore, when the embedded historians create a proxy of the object that is imaged, the interface and base data types implemented by the object can typically be loaded into other server/clients automatically, for example.

In a related aspect, a locator component can define type of historian data to be automatically located and collected from the embedded historians, and further assigns type of historian data to be collected by such embedded historians. For example, the locator component can employ a trail of metadata to identify the embedded historians and relevant historian data for collection. Additionally, a polling/publication arrangement can also be employed wherein the embedded historians (e.g., microhistorians) identify themselves to the locator component upon occurrence of a predetermined event, and/or periodically.

Accordingly, a distributed and scalable framework can be provided, which enables data historian functionality to be efficiently incorporated at various levels of an enterprise. For example, from lower control levels of a plant, to middle tiers of the plant (which collect data from the lowest levels) and from enterprise levels that aggregate data from such lower and middle levels, the embedded historian components can interact with a locator component, to facilitates data collection across an organizational hierarchy. Such framework can employ a directory and location service to enable configuration of embedded historians and to allow automated integration at the various levels of the organization.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
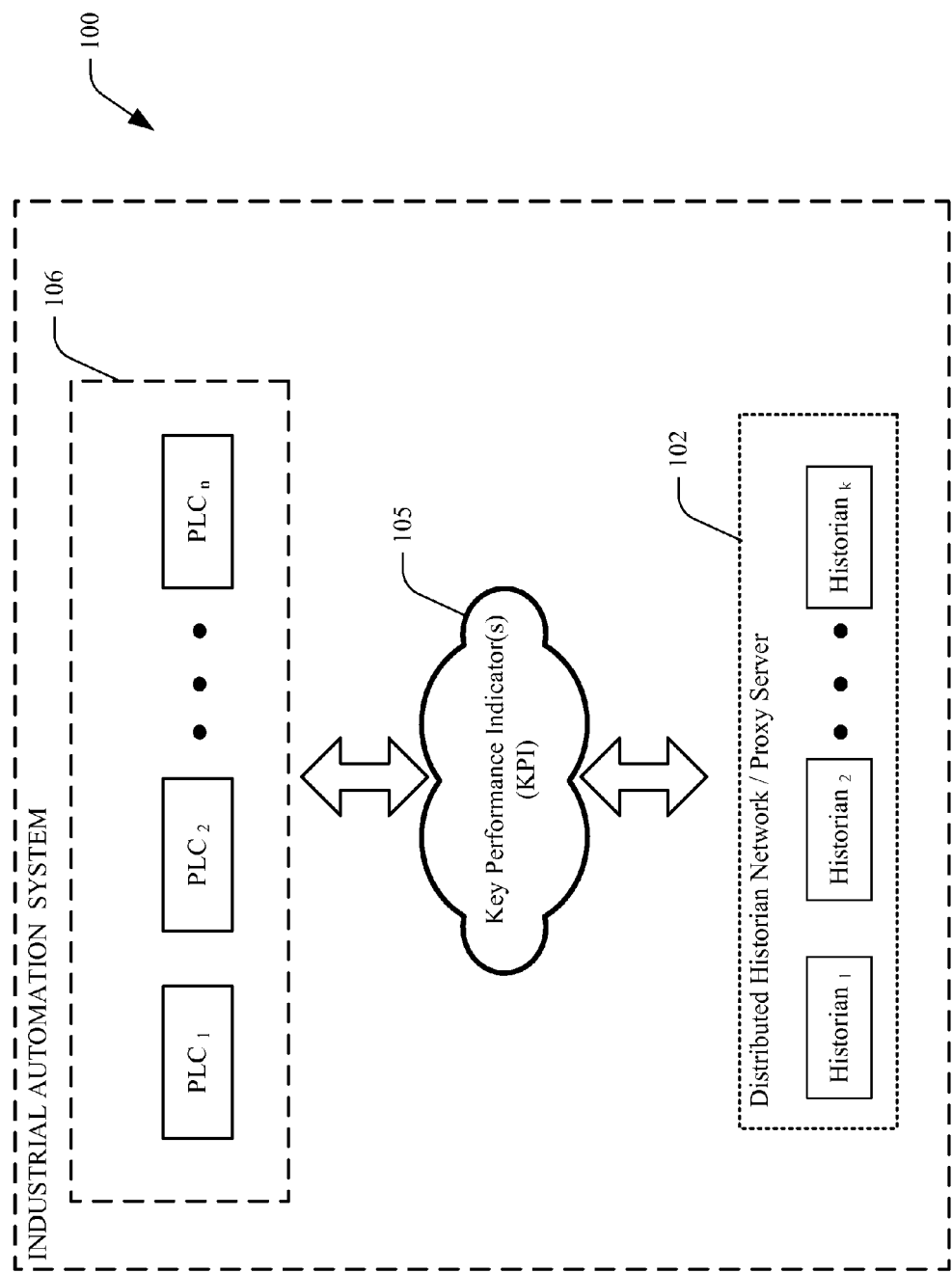
FIG. 1 illustrates a block diagram of distributed historians that function as a proxy component(s) to supply plant level data back to the controllers.

FIG. 1 illustrates a block diagram of a distributed historian network 102 (1 to k, where k is an integer) that functions as a proxy component to supply plant level data, (e.g., history data) back to the controllers, such as programmable logic controllers 106 (1 thru n, where n is an integer.) Accordingly, the historians 102 (e.g., micro historians) can function as clients/servers, to provide higher level data to the controllers (e.g., from third party databases).

For example, control programs associated with the distributed historian network 102 can direct such record keeping modules to read data values, and supply an array of Key performance indicators (KPI) 105 to the controllers 106. Such KPIs 105 can include customizable business metrics employed to visualize status and trends in the industrial automation system 100. Once the industrial automation system 100 defines its mission or objectives, KPIs 195 can be employed to measure progress toward such objectives. For example, each KPI can have a target value and an actual value, wherein the target value represents a quantitative goal or object that is considered key or critical to the success of a process related to the industrial automation system 100. Likewise, the actual value can represent a value that fluctuates often based on the actions and performance of the industrial automation system. As such, actual values can be compared to target values to determine processes' health or progress toward the target value. Thus KPIs are advantageous in that they provide a clear description of organizational goals and distill vast quantities of data down to a single value that can be employed to continuously monitor business performance and its progress toward organization benchmarks. Furthermore, the KPIs 105 can facilitate organization management of the industrial system 100, wherein the KPIs 105 can reflect critical success factors and such KPIs can be measured consistently with accuracy. Accordingly, control programs of the historians 102 can facilitate reading data values associated with processes, and supply them in form of the KPIs 105 to the programmable logic controllers 106. Hence, historical data, in conjunction with current collected data, can be readily supplied to the controllers 106, wherein such data can then be employed for modifying a process in real time.

Figure 2:
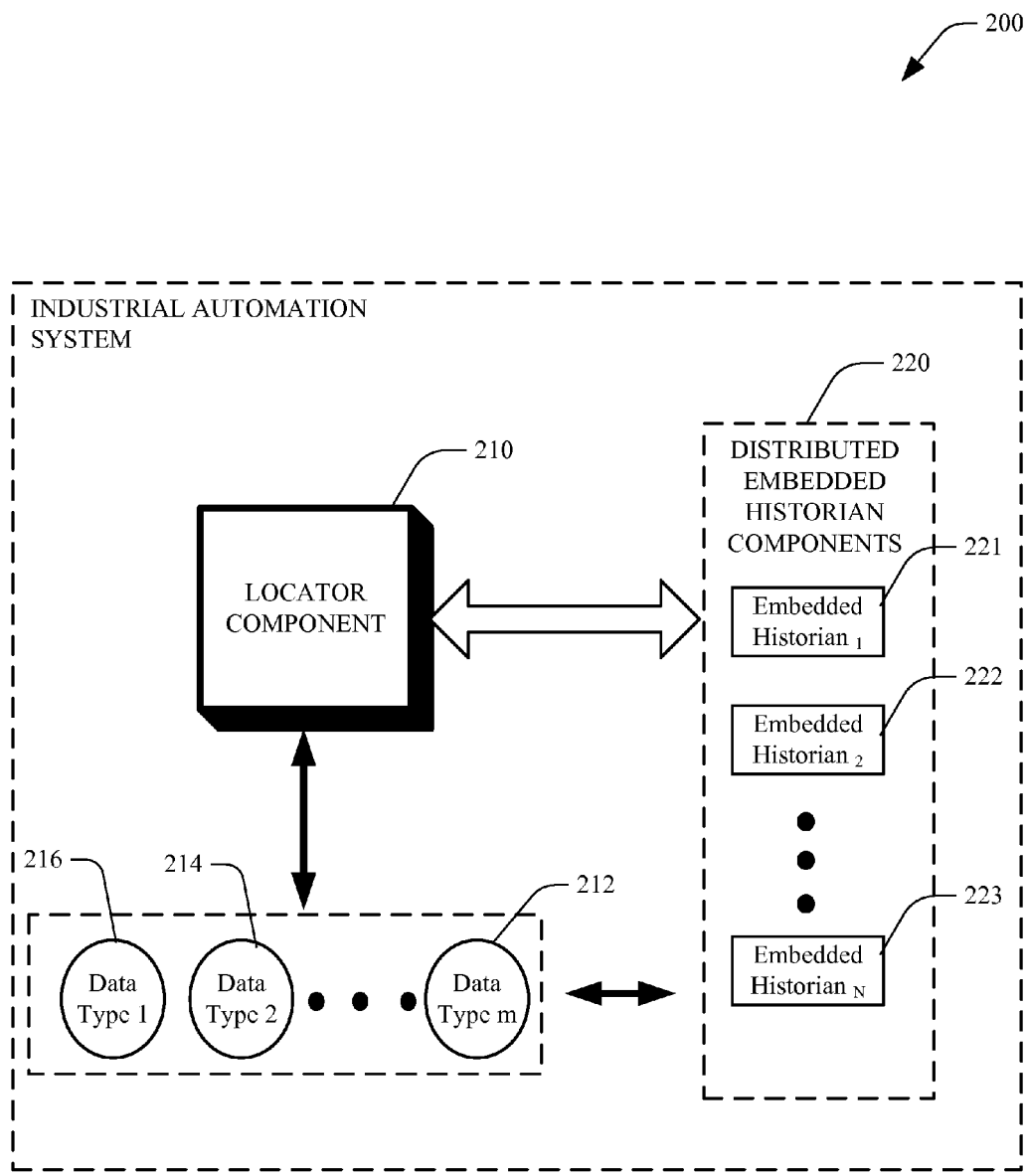
FIG. 2 is a schematic block diagram of a locator component that can detect embedded historians that function as proxies, in accordance with an aspect of the subject innovation.

FIG. 2 illustrates a locator component 210 that is associated with a plant embedded historian network 220, which can function as a proxy component to supply plant level data, (e.g., history data) back to the controllers of the industrial automation system 200. The locator component 210 can facilitate discovery of history data and further detect embedded historians that are distributed on the back plane of an industrial network. For example, the locator component 210 can be part of applications running on a control unit, which can function as a management control center for the industrial network system 200. Accordingly, a distributed embedded historian framework is provided, wherein historical data types 212, 214, 216 (1 thru m, m being an integer) can be collected in accordance with an organizational model of a hierarchical system that is distributed across various elements of an enterprise. Such an arrangement enables data identified for historian purposes to be automatically collected and also allows embedded historian functionality to be exposed and thus efficiently integrated with other elements of an organization. These elements can include representations of the system that are maintained on higher-level business servers and other representations that serve control elements of the system such as programmable logic controllers and/or other industrial control components (e.g., sensors, modules, and the like), for example.

As explained in detail infra, a directory service (not shown) can further operate with the organizational model to enable configuration of embedded historians within the organization, and to enable data types 212, 214, and 216 to be located within the organization. For example, common organization functionality such as security services can be distributed to the embedded historians 221, 222, 223 according to the data model and directory service, wherein the common data model then exposes functionality and data of the organization to the distributed embedded historians 221, 222, 223.

In contrast to conventional PC historians, embedded historians (e.g., micro historians) 221, 222, 223 are special purpose historians that reside in a backplane and supply direct interface (e.g., without a transition layer) to controllers and/or associated industrial units. Such embedded historians employ industrial specifications (e.g., regarding shock vibration, sealing, contamination proofing, and the like), and supply substantially higher data exchange speed as compared to conventional PC historians. A network system (not shown) can be associated with the industrial automation system 200, which can be searched via the locator component 210. The network system can further include additional hosts (not shown), which may be personal computers, servers or other types of computers. Such hosts generally can be capable of running or executing one or more application-level (or user-level) programs, as well as initiating an I/O request (e.g., I/O reads or writes). In addition, the network system can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters.

Figure 3:
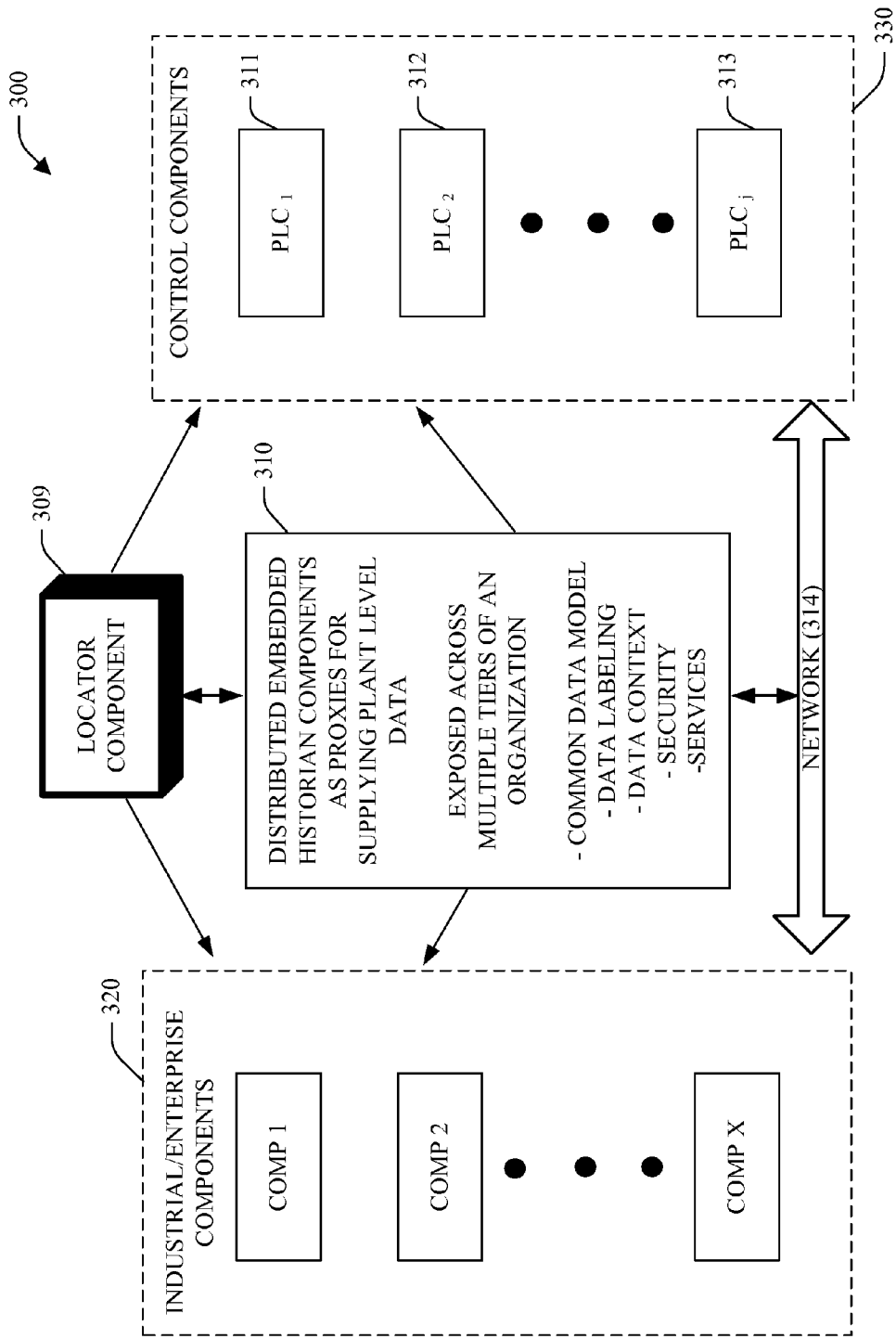
FIG. 3 illustrates a network of embedded historians within an industrial setting that interact with a locator component in accordance with an aspect of the subject innovation.

FIG. 3 illustrates a system 300 that includes a plurality of embedded historian components 310 operating in an organizational data model and functioning as a proxy component to supply plant level data back to controllers, wherein a locator component 309 can detect embedded historians (e.g., micro historians) that are distributed on the back plane of an associated industrial network. In addition, the embedded historian components 310 can be distributed across a network 314 to provide a collective or distributed database. The locator component 309 can be part of applications running on a control unit 330, which can function as a management control center for the industrial network system.

The industrial setting or organizational enterprise 300 can employ a plurality of computers or network components that communicate across the network 314, to one or more industrial control components 330, such as for example programmable logic controllers (PLCs) 311, 312, 313 (1 to j, j being an integer) or other factory components. Thus, the embedded historian components 310 can be operated as a singular or collective entity while being viewed, managed and distributed across substantially all or portions of the enterprise 320, control component 330 and/or locator component 309. For example, at the control levels 330, embedded historians can be embedded within a PLC rack to collect data, whereas higher levels at 320 can be employed to aggregate data from lower levels. Such can include higher level software components that communicate across the network 314 to collect data from lower level control components. The network 314 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and the like. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Likewise, the industrial/enterprise 320 can include various computer or network components such as servers, clients, communications modules, mobile computers, wireless components, and the like which are capable of interacting across the network 314. Similarly, the term PLC as used herein can include functionality that can be shared across multiple components, systems, and/or networks 314. For example, one or more PLCs of the control component 330 can communicate and cooperate with various network devices across the network 314. Such can include substantially any type of control, communications module, computer, I/O device, sensor, Human Machine Interface (HMI)) that communicate via the network 314 which includes control, automation, and/or public networks. The PLC 330 can also communicate to and control various other devices such as Input/Output modules including Analog, Digital, Programmed/Intelligent I/O modules, other programmable controllers, communications modules, and the like.

The system 300 enables combining organizational information such as an organizational or hierarchical data model which represents a common model of a plant that can be based in the S88 or S95 model, and is distributed among computers of the enterprise 320 and industrial controllers 330, for example. The model can be viewed as an Organizational Data Model—a tree-like hierarchical and heterogeneous structure of organizational Units. For instance, respective Organizational Units can include other Organizational Units. Organizational Units can be either physical locations (e.g., Site, Area) or logical grouping node or collection (e.g., Enterprise as a collection of Sites). The nodes in the organizational hierarchy or model can have associated items representing the plant's production and control equipment, tags, backing tags (e.g., Alarm & Event and the like), programs, equipment phases, I/O devices, and other application related entities. These organizational units thus can form an application view of the user's system.

A typical system 300 can assign the upper levels of the hierarchy such as an Enterprise node and site to a computer system and the lower levels such as area, line, cell and machine can be contained in multiple industrial controllers 330; each of which can include components that are members of one or more organization units such as area or area model. Moreover, an organization unit can contain components from one or more controllers. The embedded historian component 310 can be positioned at various levels of the enterprise 320 and/or control 330; and can also further be integrated therein and scaled according to system data collection requirements. Such organizational model enables embedded historian components 310 to locate data of interest for collection purposes and to readily adapt and become integrated within the larger system 300.

Adaptability within the system 300 can be facilitated by data having additional information such as metadata that identifies the purpose of the data. Such metadata can further be employed by the locator component 309 to identify a micro-historian. For example, the locator component 309 can employ a trail of metadata to identify the embedded historians and relevant historian data for collection Accordingly, one form of data can identify itself as a control tag that has been marked or labeled via metadata to indicate its significance for data collection purposes. Another type of label or metadata can indicate security information that is being distributed throughout the system 300. Furthermore, other type of data can indicate that an alarm condition or an event has occurred within the system and thus, a respective embedded historian component should capture such alarm or event. In general, the organizational model enables embedded historian components 310 to receive functionality or data context from the system 300 and to expose its respective functionality to the system via the model. For example, context allows embedded historian components to such auto configuration routines where one or more components of the embedded historian architecture can be automatically discovered and configured onto a respective system. Hence, the embedded historian components 310 and the locator component 309 can be automatically integrated within the system 300, to further facilitate scaling of the system as data conditions change.

In a related aspect, such scaling can include the ability of one or more components of an organization to collaborate, and provide an overall scheme for historical data collection. Such can include having lower level PLCs or factory components collecting data and sharing this data with higher levels of the organization. If one or more of the levels become overloaded with the data collection process, historian functionality can be shifted between levels (upwards or downwards) to more effectively employ system-wide resources in an efficient manner. For instance, communications between levels can allow sharing of data collection responsibilities between one or more levels of the enterprise from the very lowest levels through the higher levels of the organizational hierarchy.

For example, the lowest level entity can have sufficient memory for data collection of desired embedded historian or archived information. If such memory resources are consumed, messaging capabilities throughout the hierarchy can subsequently take over to distribute storage responsibilities from one layer to another via suitable network messages (wireless or wired) that communicate data from one level to another. It is to be appreciated that tiers of an organization can collaborate in many combinations. Thus, a high level tier could collaborate with a low level tier or collaboration can take place between multiple tiers if desired such as between higher levels, intermediate levels, and lower levels of an organization.

The locator component 309 can identify embedded historians (e.g., micro-historians), and notify them to collect various data types. The locator component 309 can subsequently locate embedded historians that have collected or have access to a collection of such data type. Next, the data can be acquired, supplied and reported to the user via a plurality of interfaces. Such interfaces can be supplied to manipulate the embedded historian components 310 and organizational data model; such as a Graphical User Interface (GUI) to interact with the model or other components of the hierarchy; e.g., as any type of application that sends, retrieves, processes, and/or manipulates factory or enterprise data, receives, displays, formats, and/or communicates data, and/or facilitates operation of the enterprise 320 and/or PLCs 330. For example, such interfaces can also be associated with an engine, server, client, editor tool or web browser although other type applications can be utilized.

Figure 4:
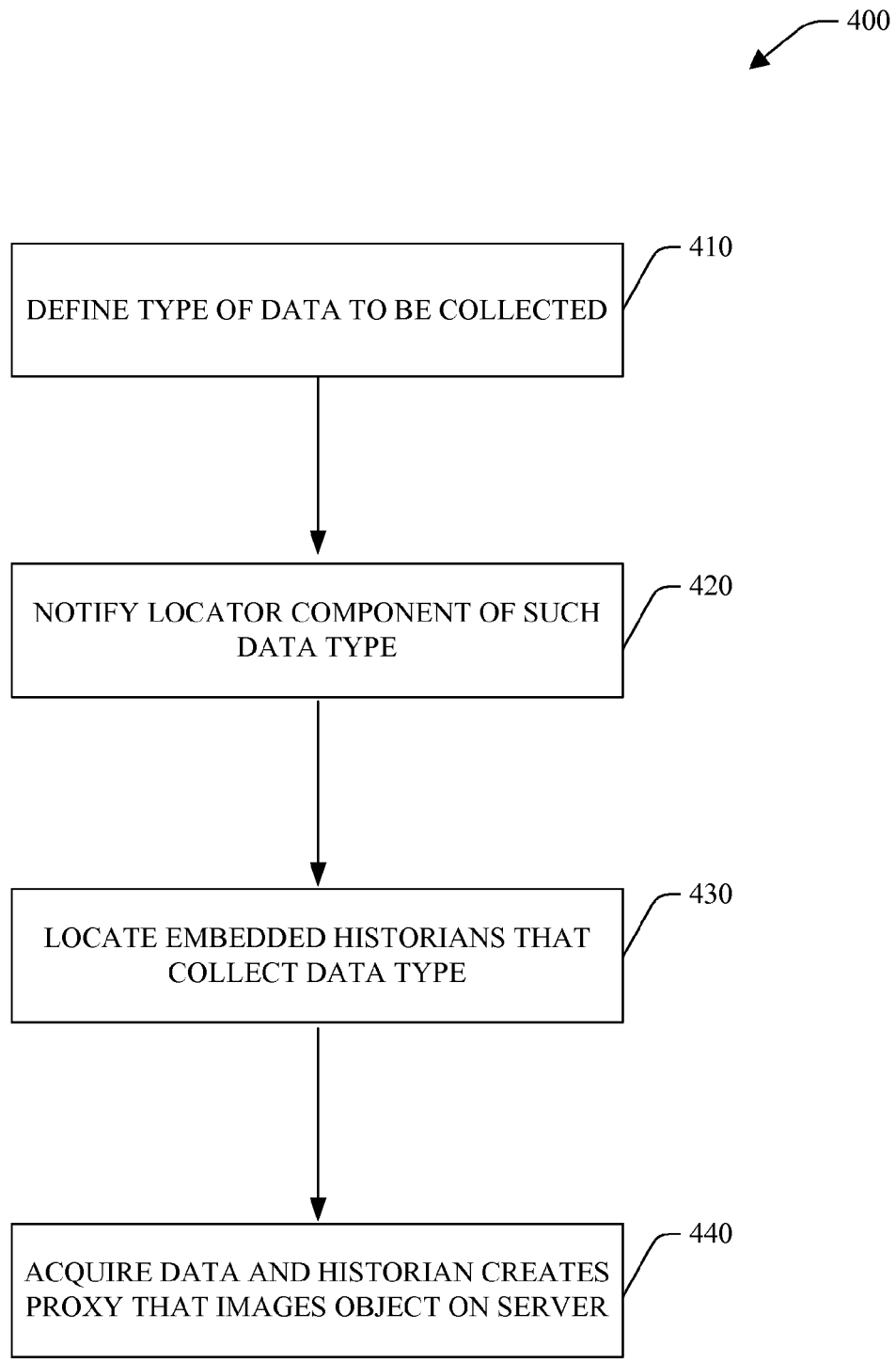
FIG. 4 illustrates a related methodology of proxy function and embedded historian location/data collection in accordance with an aspect of the subject innovation.

FIG. 4 illustrates a related methodology 400 of proxy function and embedded historian location/data collection in accordance with an aspect of the subject innovation. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially and at 410, users can initially determine type of data to be collected. Subsequently, and at 420 the locator component is notified for collection of such data type. The locator component can then locate embedded historians that have collected or have access to a collection of such data type, at 430. Next, the data can be acquired, wherein the historian can create a proxy that images an object on a server associated with controllers, at 440.

Figure 5:
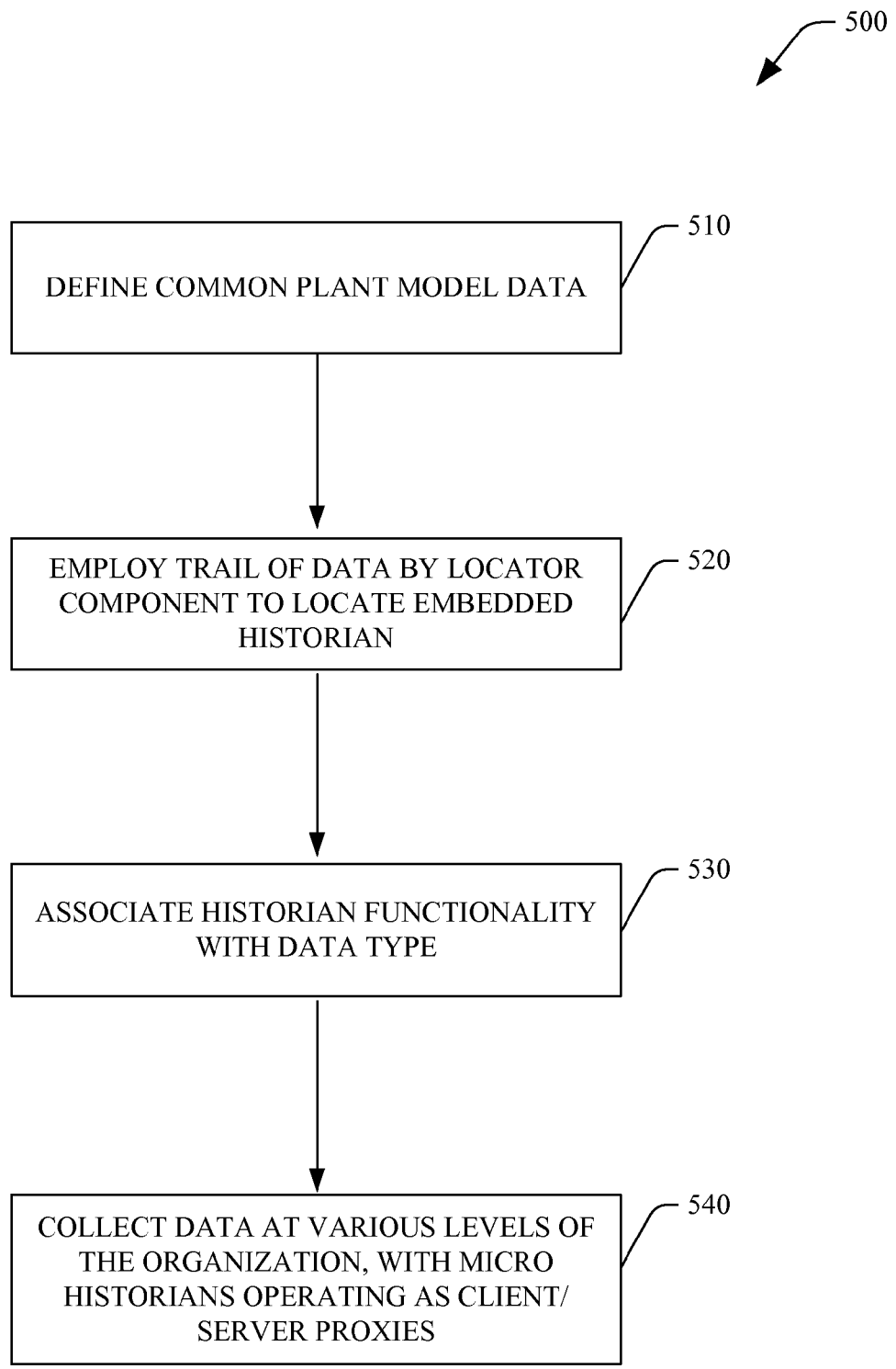
FIG. 5 illustrates a related methodology of data collection, via a plurality of embedded historians that act as proxies and are locatable thru the locator component.

FIG. 5 illustrates a related methodology 500 of data collection, via a plurality of embedded historians that act as proxies and are locatable thru the locator component. Initially, and at 510, a common organizational or plant data model is defined. Such model can supply the ability to describe the functionality of data in a system such as can be provided by metadata for example. Next and 520, the locator component can employ trail of data to locate a desired embedded historian. Such can further include employing a directory to determine where the source or destination for a particular embedded historian data structure is located. At 530, embedded historian functionality can be associated with the common data structure, wherein the controller can specify that such data is to be collected by an embedded historian component. Similarly, data can be exposed to embedded historian components according to its metadata or other determined data context. At 540, embedded historian data is collected across various levels of an organization according to the plant data model and via the associated directory service, wherein the micro-historians can function as clients/servers, to supply data for modification of the process in real time.

Figure 6:
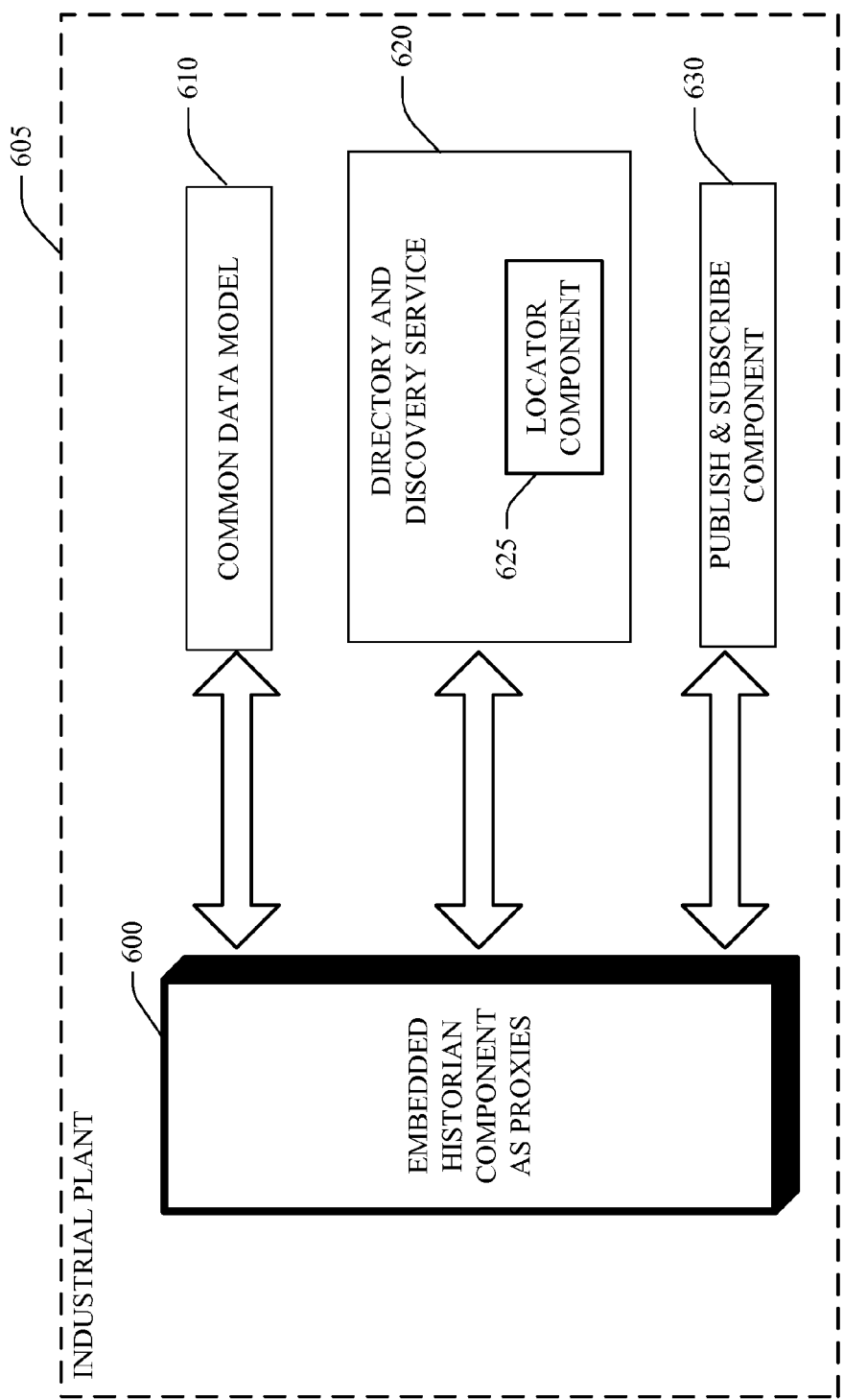
FIG. 6 illustrates a locator component that is operatively connected to embedded historian network/embedded historians, which function as proxies in accordance with an aspect of the subject innovation.

FIG. 6 illustrates a locator component 625 that is operatively connected to embedded historian network/embedded historians 600 that function as proxies in accordance with an aspect of the subject innovation. The industrial setting 605 can employ a hierarchical data model with various level; e.g., enterprise level, site level (factory represented within a data packet), area level (an area within the factory associated with the data); line level (a line associated with particular data), a work-cell level (that indicates a work-cell associated with the data) and the like. For example, by employing a nested, hierarchical data model, embedded historian components 600 can readily become aware of data associated therewith. Furthermore, such hierarchy can further be customized by users to obtain increased granularity within the hierarchy. The common plant model can enable the embedded historian component 600 to determine data contexts in an automated manner. The common data model 610 allows data to be marked or labeled via metadata for example to both expose embedded historian functionality to a system and/or to allow the embedded historian component 600 to be automatically integrated within the system according to data that is exposed to the embedded historian component. For example, one such labeling can pertain to security, and typically can affect substantially all components in the system associated with the common model 610.

The locator component 625 can be associated with a directory and discovery service. Such an arrangement enables the embedded historian component 600 to locate other embedded historian components in the system and to receive/expose historian data to other system components. This can include a network directory that determines physical addresses from logical names and vice versa, for example. Moreover, the publish and subscribe component 630 can provide subscription functionality to the embedded historian component 600, wherein data collection efficiency of the system can be enhanced. For example, the publish and subscribe component 630 of the system 605 allows data to be published or generated when a change in the data has been detected. Thus, the embedded historian component 600 can subscribe to such change events and thus only record data when a change has occurred which reduces the amount of data to be stored. Furthermore, the locator component 625 can employ a trail of metadata to identify the micro-historians and relevant historian data for collection. Additionally, a polling/publication arrangement can also be employed wherein the embedded historians (e.g., micro-historians) identify themselves to the locator component upon occurrence of a predetermined event, and/or periodically.

Figure 7:
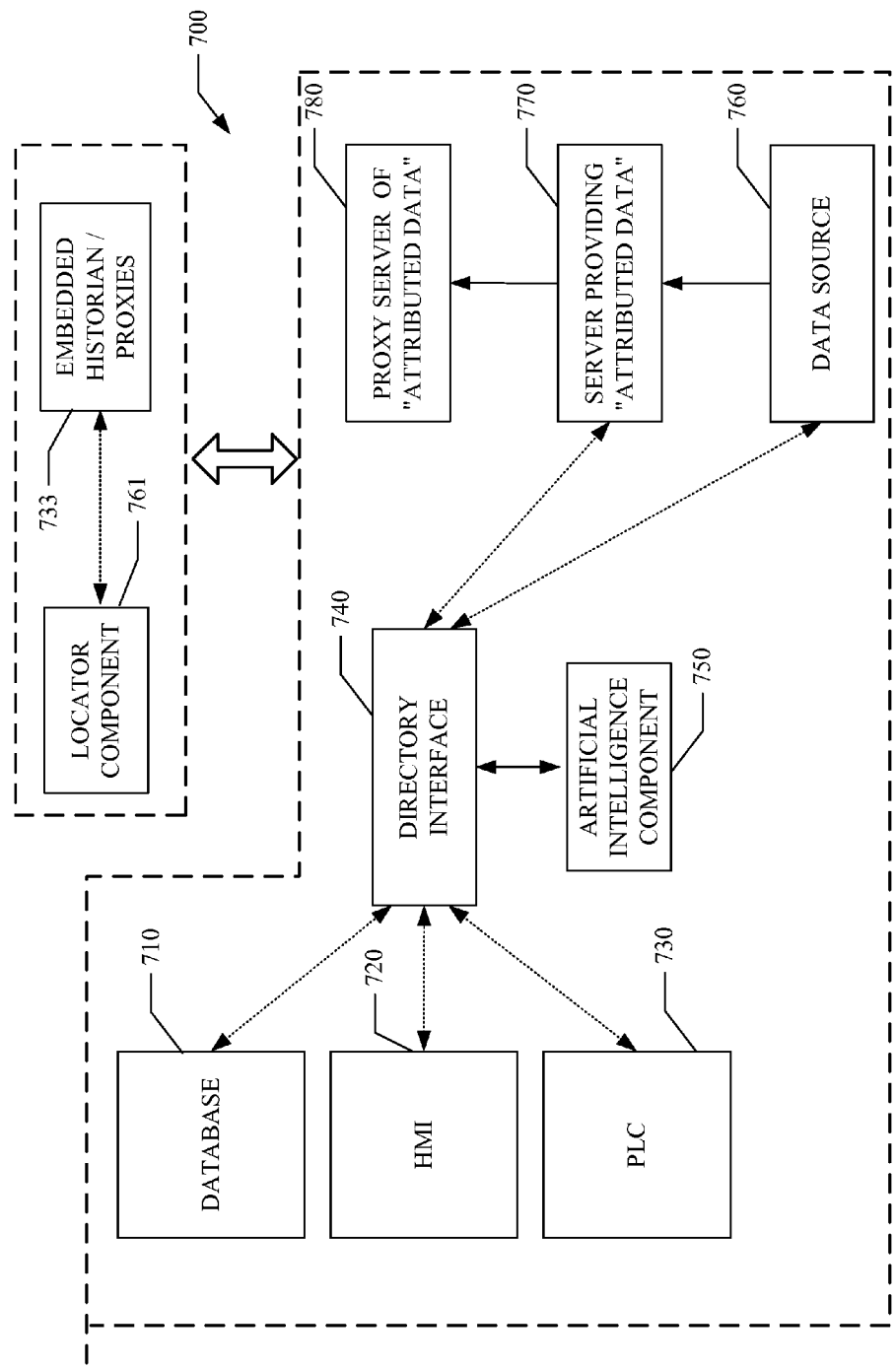
FIG. 7 illustrates an exemplary industrial automation network that employs embedded historians, to function as proxies and enable high speed data collection.

FIG. 7 illustrates an exemplary industrial automation network that employs an embedded historian component 733, to function as proxies to enable high speed data collection (e.g., real time) from the industrial setting 700, which can include a database 710, a human machine interface (HMI) 720 and a programmable logic controller (PLC) 730, and a directory interface 740. The directory interface 740 can further associate with an Artificial Intelligence (AI) component 750 to facilitate efficient identification of desired data within a particular network/application. The directory interface 740 can be employed to provide data from an appropriate location such as the data source 760, a server 770 and/or a proxy server 780. Accordingly, the directory interface 740 can point to a source of data based upon role and requirements (needs) of a requester (e.g., database 710, HMT 720, PLC 730, and the like.) The database 710 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. In this regard, particular ERP applications may require data that has certain desired attributes associated therewith. Thus, in accordance with an aspect of the subject invention, the directory interface 740 can provide data to the database 710 from the server 770, which provides data with the attributes desired by the database 710.

As illustrated in FIG. 7, the embedded historian 733 can leverage directory interface 740 and other Unified Plant Model (UPM) services to locate other embedded historian components and their configurations, via the locator component of the subject innovation. Such locator component 761 can further detect embedded historians 733 that are distributed on the back plane of an industrial network. The locator component 761 can be part of applications running on a control unit, which can function as a management control center for the industrial network system.

Moreover, the HMI 720 can employ the directory interface 740 to point to data located within the system 700. The HMI 720 can be employed to graphically display various aspects of a process, system, factory, etc. to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 720 can request data to have particular visualization attributes associated with data in order to easily display such data thereto. For example, the HMI 720 can query the directory interface 740 for a particular data point that has associated visualization attributes. The directory interface 740 can determine the proxy server 780 contains the attributed data point with the desired visualization attributes. For instance, the attributed data point can have a particular graphic that is either referenced or sent along with the data such that this graphic appears within the HMI environment instead of or along with the data value.

As explained earlier, the PLC 730 can be any number of models such as Allen Bradley PLC5, SLC-500, MicoLogix, and the like. The PLC 730 is generally defined as a specialized device employed to provide high-speed, low-level control of a process and/or system. The PLC 730 can be programmed using ladder logic or some form of structured language. Typically, the PLC 730 can utilize data directly from a data source (e.g., data source 760) that can be a sensor, encoder, measurement sensor, switch, valve and the like. The data source 760 can provide data to a register in a PLC and such data can be stored in the PLC if desired. Additionally, data can be updated (e.g., based on a clock cycle) and/or output to other devices for further processing.

Figure 8:
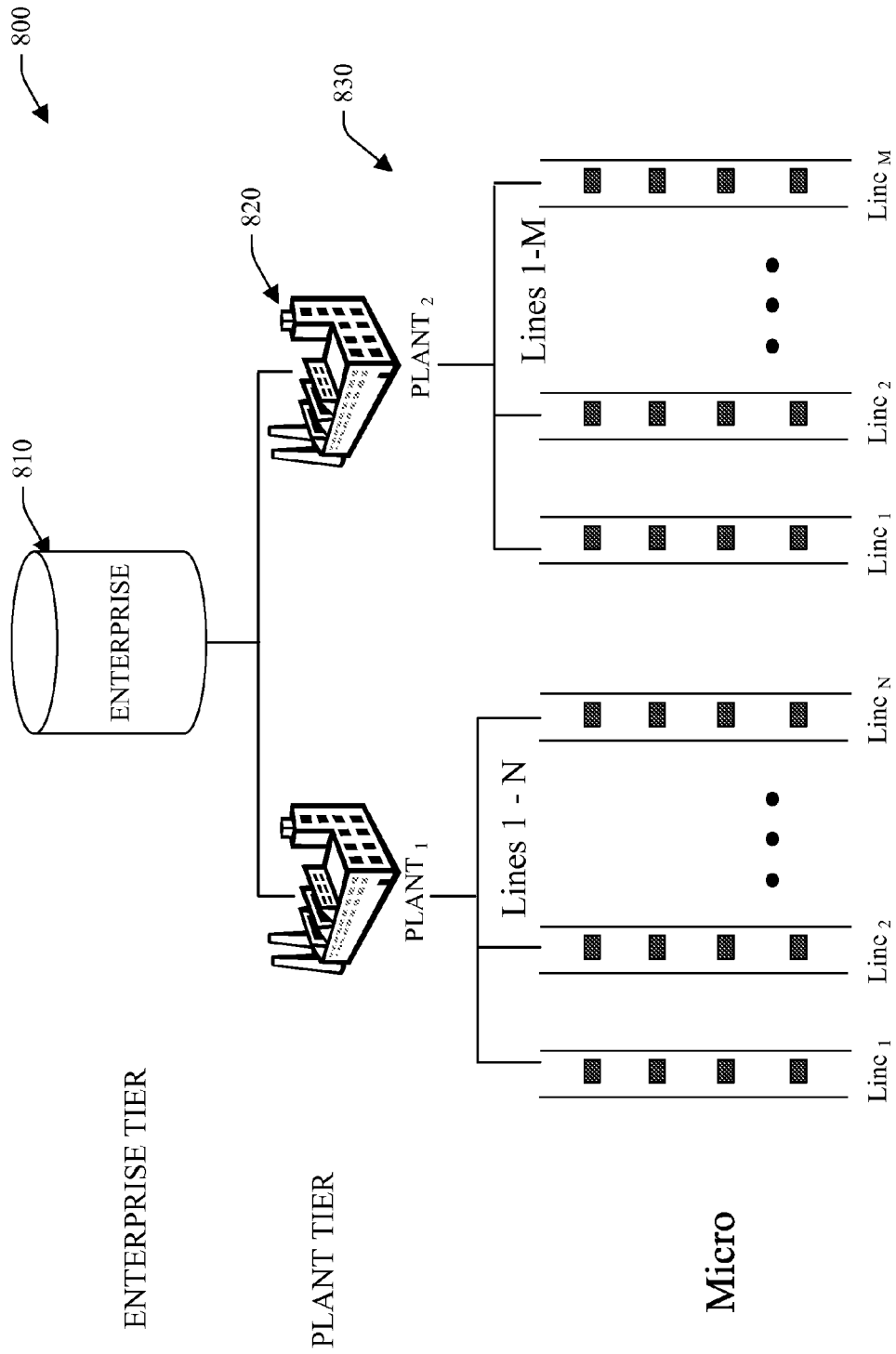
FIG. 8 illustrates an exemplary multi-tiered and distributed historian system that can function as proxies in accordance with an aspect of the subject innovation.

FIG. 8 illustrates an exemplary multi-tiered and distributed historian system 800 that can function as proxies in accordance with an aspect of the subject innovation. The exemplary system 800 illustrates three tiered historian level, wherein the highest data collection tier is illustrated and can be referred to as the enterprise tier 810. This tier aggregates data collected from lower level tiers such as from a plant tier 820 and a micro or embedded tier 830. As illustrated, the tiers 810 and 820 can include archival or permanent storage capabilities. In the system 800, data can be collected from two plants at the tier 820, and from a plurality of historian components at tier 830. It is to be appreciated that such an arrangement is exemplary in nature, and other arrangements are well within the realm of the subject innovation.

Typically, the system 800 can be viewed as a Distributed Historian that spans machines, plants, and enterprises. At level 830, the historian collects data at the rack level and is coupled to Common Plant Data Structure described above. Such can include collecting process & discrete data, alarms & events in a single archive if desired. Other aspects can include auto-discovery of data and context from controllers in local chassis including store/forward data capabilities from local buffers. Data can be collected without polling, having a low communications bandwidth. The plant level 820 aggregates data from Micro or rack-embedded Historians and/or other data sources (e.g., Live Data source). Such can include plant-level querying, analytics, reporting while efficiently storing, retrieving, and managing large amounts of data. This level can also auto-discover data and data model context from Micro Historians located at level 830. Other features of the system 800 can include analysis components, logical units, components for interaction with report elements, embeddable presentation components, replication of configuration, storage, archiving, data compression, summarization/filtering, security, and scalability.

Figure 9:
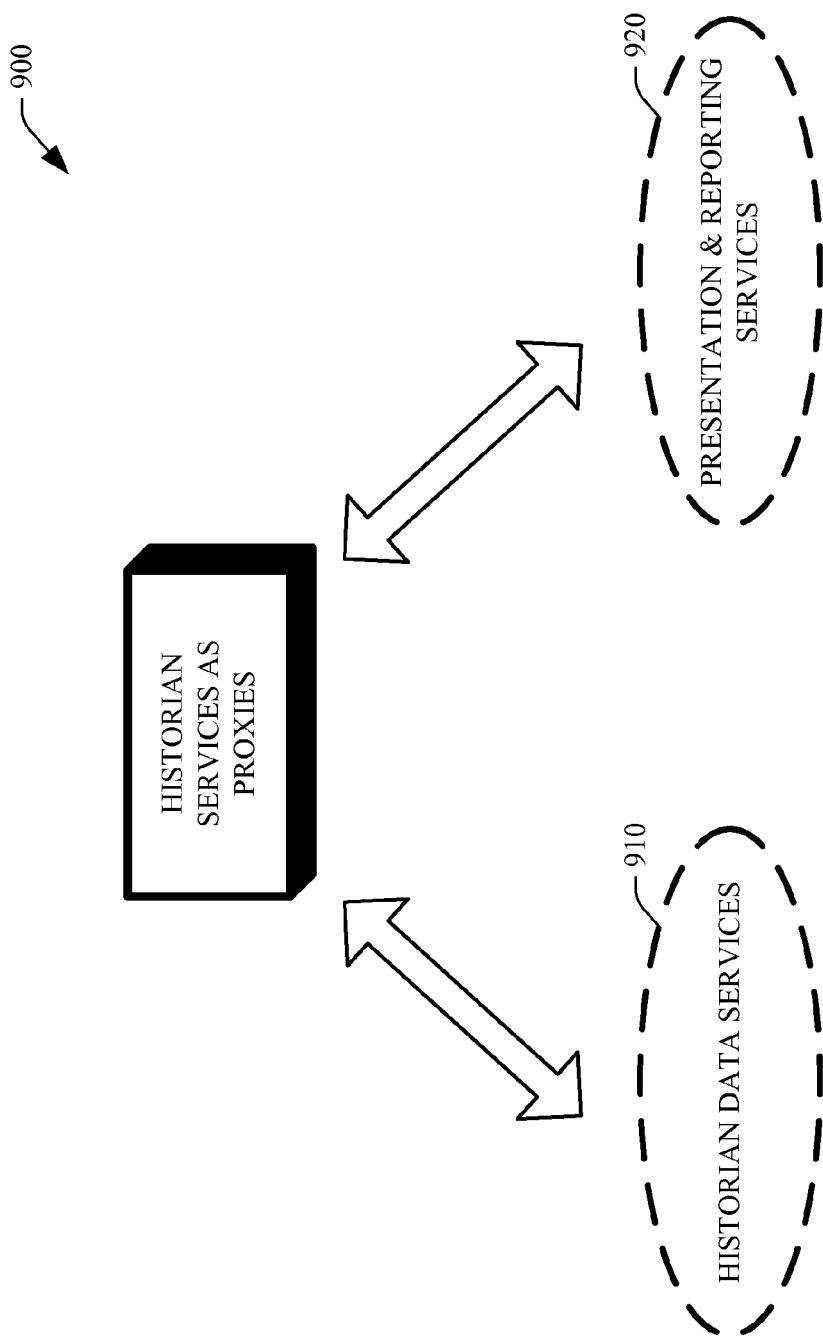
FIG. 9 illustrates historian services that include historian data services and presentation and reporting services.

FIG. 9 illustrates historian services 900 that include historian data services 910 and presentation and reporting services 920. Historian Data Services 910 (HDS) can supply generic, customizable services for collecting and storing data with plant model-defined context. This can include configuration of data to be collected e.g., tags, data context, alarms, events, diagnostics, SOE data and configuration of data to be forwarded to a higher level. Collection of data can be from disparate sources including storage of data, retrieval of data, and management of data. Management of data collected by/residing in other data stores (e.g., higher-level business systems, 3rd party products) can be processed by the respective applications. The presentation and reporting services 920 (PRS) can supply generic, customizable services for collating and presenting data in a common plant model-defined context. This can include access to stored data, analysis/calculators and query mechanisms, and embeddable, interactive presentation components (e.g., text, charts, SPC). The service 910 can generate reports with various means of presentation/distribution (e.g., web, email) having export capabilities to standard formats (e.g., XML, Excel).

Figure 10:
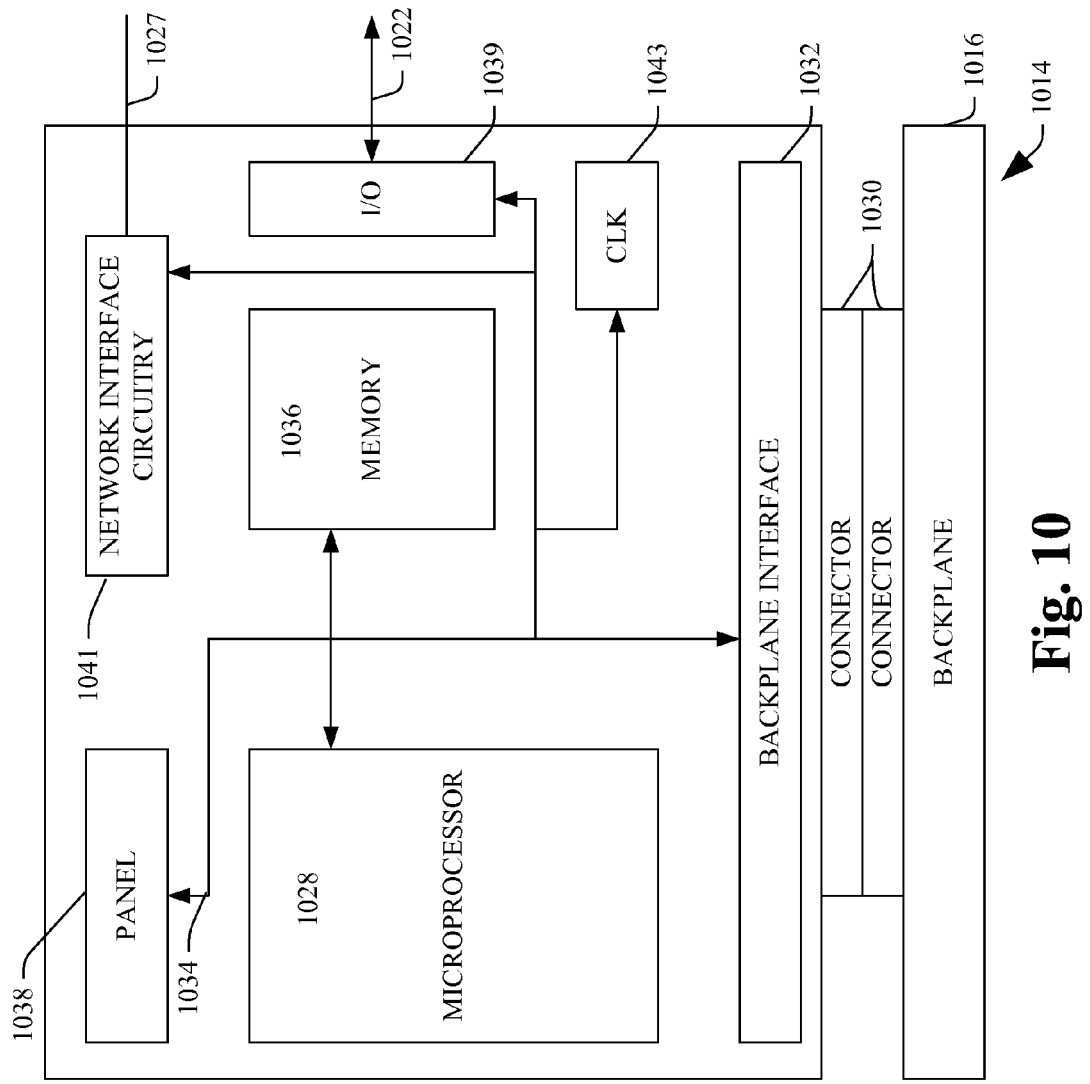
FIG. 10 illustrates an industrial setting with a backplane and associated modules in accordance with an aspect of the subject innovation.

In order to provide context for the various applications in which the aspects of the innovation may be carried out, an exemplary control system that can employ a locator component that tracks embedded historians, which function as proxies, is now illustrated and described with respect to FIG. 10. As illustrated, each functional module 1014, is attached to the backplane 1016 by means of a separable electrical connector 1030 that permits the removal of the module 1014 from the backplane 1016 so that it may be replaced or repaired without disturbing the other modules 1014. The backplane 1016 provides the module 1014 with both power and a communication channel to the other modules 1014. Local communication with the other modules 1014 through the backplane 1016 is accomplished by means of a backplane interface 1032 which electrically connects the backplane 1016 through connector 1030. The backplane interface 1032 monitors messages on the backplane 1016 to identify those messages intended for the particular module 1014, based on a message address being part of the message and indicating the message destination. Messages received by the backplane interface 1032 are conveyed to an internal bus 1034 in the module 1014.

The internal bus 1034 joins the backplane interface 1032 with a memory 1036, a microprocessor 1028, front panel circuitry 1038, I/O interface circuitry 1039 and communication network interface circuitry 1041. The microprocessor 1028 can be a general purpose microprocessor providing for the sequential execution of instructions included within the memory 1036 and the reading and writing of data to and from the memory 1036 and the other devices associated with the internal bus 1034. The microprocessor 1028 includes an internal clock circuit (not shown) providing the timing of the microprocessor 1028 but may also communicate with an external clock 1043 of improved precision. This clock 1043 may be a crystal controlled oscillator or other time standard including a radio link to an external time standard. The precision of the clock 1043 may be recorded in the memory 1036 as a quality factor. The panel circuitry 1038 includes status indication lights such as are well known in the art and manually operable switches such as for locking the module 1014 in the off state.

The memory 1036 can comprise control programs or routines executed by the microprocessor 1028 to provide control functions, as well as variables and data necessary for the execution of those programs or routines. For I/O modules, the memory 1036 may also include an I/O table holding the current state of inputs and outputs received from and transmitted to the industrial controller 1010 via the I/O modules 1020. The module 1014 can be adapted to perform the various methodologies of the innovation, via hardware configuration techniques and/or by software programming techniques.

It is noted that as used in this application, terms such as "component," "hierarchy," "model," and the like are intended to refer to electromechanical components, and/or a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

What has been described above includes various exemplary aspects. It is, of course, not possible to describe every conceivable combination of components or methodologies for purposes of describing these aspects, but one of ordinary skill in the art may recognize that many further combinations and permutations are possible. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
a control component that employs historian data for a control of the industrial automation system; and
a plurality of embedded historians that collect the historian data and serve as a proxy thereof for the control component.

2. The industrial automation system of claim 1 further comprising a locator component that detects the embedded historians and assigns type of historian data to be collected.

3. The industrial automation system of claim 1 further comprising an organizational hierarchy data model with nodes that represent units associated with the industrial automation system.

4. The industrial automation system of claim 1 the locator component operatively connected to a directory service to facilitate discovery service.

5. The industrial automation system of claim 1 further comprising an artificial intelligence component that facilitates identification of data collected by the embedded historians.

6. The industrial automation system of claim 1 further comprising a Human Machine Interface (HMI) to graphically display a view of the industrial automation system.

7. The industrial automation system of claim 1 further comprising a graphical user interface (GUI) that forms an application view of a historian data collection system.

8. The industrial automation system of claim 3, the common organizational hierarchy data model facilitates data determined for collection.

9. The industrial automation system of claim 1, the embedded historians associated with at least one of a controller, a module in a chassis, a server, a sensor, and a factory component.

10. The industrial automation system of claim 3, the organizational hierarchy data model employs metadata for identification of embedded historians to the locator component.

11. The industrial automation system of claim 2, further comprising a publish and subscribe component that identifies embedded historians to the locator component.

12. A method of supplying key performance indicators to controllers of an industrial plant comprising:

collecting data via a plurality of embedded historians;
creating a proxy for the data via the embedded historians; and
supplying the data to the controllers.

13. The method of claim 12 further comprising locating the embedded historians via a locator component.

14. The method of claim 13 further comprising employing metadata to facilitate a trail to the embedded historians.

15. The method of claim 13 further comprising defining a common organizational data model for the industrial plant.

16. The method of claim 13 further comprising employing a directory to track source of data.

17. The method of claim 13 further comprising collecting historian data across various levels of the industrial plant.

18. The method of claim 13 further comprising employing a polling mechanism for embedded historian detection and identification.

19. The method of claim 13 further comprising integrating additional embedded historians to the industrial plant.

20. An industrial controller system comprising:

representing means for representing collected data in form of a proxy in an industrial process;
means for locating the representing means; and
means for publishing the representing means.

* * * * *